United States Patent
Nakabo

(10) Patent No.: US 6,681,343 B1
(45) Date of Patent: Jan. 20, 2004

(54) DEBUGGING DEVICE AND METHOD AS WELL AS STORAGE MEDIUM

(75) Inventor: Namiko Nakabo, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 544 days.

(21) Appl. No.: 09/644,696

(22) Filed: Aug. 24, 2000

(30) Foreign Application Priority Data

Aug. 24, 1999 (JP) ............................................ 11-236972

(51) Int. Cl.⁷ ................................................ G06F 11/00
(52) U.S. Cl. ........................................ 714/38; 717/125
(58) Field of Search ................... 714/38, 46; 717/125, 717/129

(56) References Cited

U.S. PATENT DOCUMENTS

| | | | | | |
|---|---|---|---|---|---|
| 5,410,648 | A | * | 4/1995 | Pazel ........................... | 717/124 |
| 5,652,899 | A | * | 7/1997 | Mays et al. .................. | 715/512 |
| 5,687,375 | A | * | 11/1997 | Schwiegelshohn .......... | 717/129 |
| 5,812,759 | A | * | 9/1998 | Brooks ......................... | 714/57 |
| 5,815,714 | A | * | 9/1998 | Shridhar et al. ............. | 717/129 |
| RE36,422 | E | * | 11/1999 | Pazel ........................... | 707/104 |
| 6,067,641 | A | * | 5/2000 | McInerney et al. .......... | 714/38 |
| 6,091,896 | A | * | 7/2000 | Curreri et al. ............... | 717/125 |
| 6,216,237 | B1 | * | 4/2001 | Klemm et al. ................ | 714/38 |
| 6,438,713 | B1 | * | 8/2002 | Taira et al. .................. | 714/38 |

FOREIGN PATENT DOCUMENTS

| | | |
|---|---|---|
| JP | A 57-103549 | 6/1982 |
| JP | A 62-54337 | 3/1987 |
| JP | A 1-255937 | 10/1989 |
| JP | A 2-64747 | 3/1990 |
| JP | A 2-118853 | 5/1990 |
| JP | A 2-210556 | 8/1990 |
| JP | A 3-37735 | 2/1991 |
| JP | A 4-175926 | 6/1992 |
| JP | A 5-81069 | 4/1993 |
| JP | A 5-342052 | 12/1993 |
| JP | A 6-314193 | 11/1994 |
| JP | A 7-271565 | 10/1996 |
| JP | A 8-286897 | 11/1996 |
| JP | A 9-6644 | 1/1997 |

* cited by examiner

*Primary Examiner*—Robert Beausoliel
*Assistant Examiner*—Bryce P. Bonzo
(74) *Attorney, Agent, or Firm*—Young & Thompson

(57) ABSTRACT

A device for debugging a program includes a memory unit for storing a program having a hierarchical structure to be debugged; a display unit for displaying the program stored in the memory; a display state control unit for controlling the display unit to display statements included in the program in selected one of first and second states; and a step-execution unit for performing a step-execution of the program to be debugged in accordance with the selected one of the first and second states.

20 Claims, 20 Drawing Sheets

| Line number | PC-position | Source program screen |
|---|---|---|
| 5 − 1 | | ✳ void Main() |
| 5 − 2 | | ✳ { |
| 5 − 3 | | ✳    Initialize(); |
| 5 − 4 | | ✳    int nCnt; |
| 5 − 5 |  | >    for( nCnt = 0; nCnt < MAXCNT; nCnt++ ) { |
| 5 − 6 | |    >    if( bSet ){ |
| 5 − 8 | | ✳       bSet = false; |
| 5 − 9 | | ✳    } |
| 5 − 10 | | ✳    Sub(); |
| 5 − 11 | | ✳    ... |
| 5 − 12 | | ✳    ... |
| 5 − 13 | | ✳ } |

FIG. 6

| Line number | PC-position | Source program screen |
|---|---|---|
| 6 – 1 | | ✳ void Main() |
| 6 – 2 | | ✳ { |
| 6 – 3 | | ✳    Initialize(); |
| 6 – 4 | | ✳    int nCnt; |
| 6 – 5 | ➡ | >    for( nCnt = 0; nCnt < MAXCNT; nCnt++ ) { |
| 6 – 10 | ⇢ | ✳    Sub(); |
| 6 – 11 | | ✳    ... |
| 6 – 12 | | ✳    ... |
| 6 – 13 | | ✳ } |

FIG. 7

| Line number | PC-position | Source program screen |
|---|---|---|
| 7-1  |     | * void Main() |
| 7-2  |     | * { |
| 7-3  |     | *    int nCnt,nMode; |
| 7-4  |     | *    Initialize(); |
| 7-5  | ➡  | *    nCnt = 0; |
| 7-6  |     | >/* process 1 */ |
| 7-7  |     | *    for(; nCnt < MAXCNT; nCnt++) { |
| 7-8  |     | *        *pAddr = NULL; |
| 7-9  |     | *        pAddr++; |
| 7-10 |     | *    } |
| 7-11 |     | >/* process 2 */ |
| 7-12 |     | *    if( ··· ) { |
| 7-13 |     | *        ··· |
| 7-14 |     | *    } |
| 7-15 |     | *    Sub(); |
| 7-16 |     | *    ··· |

| Line number | PC-position | Source program screen |
|---|---|---|
| 8 − 1 | | * void Main() |
| 8 − 2 | | * { |
| 8 − 3 | | *     int nCnt,nMode; |
| 8 − 4 | | *     Initialize(); |
| 8 − 5 | ⇒ | *     nCnt = 0; |
| 8 − 6 | ⇢ | >/* process 1 */ |
| 8 − 1 1 | | >/* process 2 */ |
| 8 − 1 5 | | *     Sub(); |
| 8 − 1 6 | | *     ... | pseudo PC code display

FIG. 9

| Line number | PC-position | Source program screen |
|---|---|---|

```
9 - 1                    *   void Main()
9 - 2                    *   {
9 - 3                    *       int nCnt,nMode;
9 - 4                    *       Initialize();
9 - 5                    *       nCnt = 0;
9 - 6                    >/* process 1 */
9 - 1 1     ⇨            >/* process 2 */
9 - 1 5                  *       Sub();
9 - 1 6                  *       ...
``` pseudo PC code display

FIG. 10

| Line number | PC-position | Source program screen |
|---|---|---|
| 10-1 | * | void Main() |
| 10-2 | * | { |
| 10-3 | * | ... |
| 10-4 | * | ... |
| 10-5 | > | if( nMode ≧ 0 ){ |
| 10-6 | * | swhich( nMode ) |
| 10-7 | * | { |
| 10-8 | > | case 0: |
| 10-9 | * | ... |
| 10-10 | * | break; |
| 10-11 | > | case 1: |
| 10-12 | * | ... |
| 10-13 | * | break; |
| 10-14 | > | case 2: |
| 10-15 | * | ... |
| 10-16 | * | break; |
| 10-17 | > | default: |
| 10-18 | * | ... |
| 10-19 | * | } |
| 10-20 | > | else { |
| 10-21 | * | ... |
| 10-22 | * | ... |
| 10-23 | * | ... |
| 10-24 | * | } |
| 10-25 | * | nMode++; |
| 10-26 | * | ... |
| 10-27 | * | ... |
| 10-28 | * | } |

FIG. 11

| Line number | PC-position | Source program screen |
|---|---|---|

```
11-1          *  void Main()
11-2          *  {
11-3          *     ...                pseudo PC
11-4          *     ...                code display
11-5      ⇒   >     if( nMode ≧ 0 ){
11-20         >     else {
11-21         *        ...
11-22         *        ...
11-23         *        ...
11-24         *     }
11-25         *     nMode++;
11-26         *     ...
11-27         *     ...
11-28         *  }
```

| Line number | PC-position | Source program screen |
|---|---|---|

```
12-1        *    void Main()
12-2        *    {
12-3        *        ...
12-4        *        ...
12-5        >        if( nMode ≧ 0 ){
12-20       >        else {
12-21       *            ...
12-22       *            ...
12-23       *            ...
12-24       *        }
12-25       *        nMode++;
12-26       *        ...
12-27       *        ...
12-28       *    }
```

FIG. 13

| Line number | PC-position | Source program screen |
|---|---|---|
| 13-1 | | ✱ void Main() |
| 13-2 | | ✱ { |
| 13-3 | | ✱ ... |
| 13-4 | | ✱ ... |
| 13-5 | | ✱ ... |
| 13-6 | ➡ | >   if( nMode < 0 ){ |
| 13-7 | | ✱     nMode = 0; |
| 13-8 | | ✱     Initialize(); |
| 13-9 | | ✱     OutLineSet(); |
| 13-10 | | ✱   } |
| 13-11 | | ✱   nMode++; |
| 13-12 | | ✱   ... |
| 13-13 | | ✱   ... |
| 13-14 | | ✱ } |

| Line number | PC-position | Source program screen |
|---|---|---|
| 14-1 | | ✱ void Main() |
| 14-2 | | ✱ { |
| 14-3 | | ✱ ... |
| 14-4 | | ✱ ... |
| 14-5 | | ✱ ... |
| 14-6 | | >   if( nMode < 0 ){ |
| 14-7 |  | ✱     nMode = 0; |
| 14-8 | | ✱     Initialize(); |
| 14-9 | | ✱     OutLineSet(); |
| 14-10 | | ✱   } |
| 14-11 | | ✱   nMode++; |
| 14-12 | | ✱ ... |
| 14-13 | | ✱ ... |
| 14-14 | | ✱ } |

| Line number | PC-position | Source program screen |
|---|---|---|

```
15-1       * void Main()
15-2       * {
15-3       *      ...
15-4       *      ...
15-5       *      ...
15-6       >      if( nMode < 0 ) {
15-7       *          nMode = 0;
15-8       *          Initialize();
15-9       *          OutLineSet();
15-10      *      }
15-11      *      nMode++;
15-12      *      ...
15-13      *      ...
15-14      * }
```

FIG. 17

| Line number | Source program screen |
|---|---|
| 17-1 | * void Main() |
| 17-2 | * { |
| 17-3 | *     int nCnt,nMode = 0; |
| 17-4 | *     for(; nCnt < MAX; nCnt++){ |
| 17-5 | *         if(pData == NULL) break; |
| 17-6 | *         *pData = 0; |
| 17-7 | *     } |
| 17-8 | *     nMode++; |
| 17-9 | *     bool bRet = Sub(); |
| 17-10 | *     if(bRet == false) nMode = 0; |
| 17-11 | *     return; |
| 17-12 | * } |
| 17-13 | * |
| 17-14 | * bool Sub() |
| 17-15 | * { |
| 17-16 | *     if(nMode < 0 \|\| nMode > MODEMAX) |
| 17-17 | *         nMode = 0; |
| 17-18 | *     nMode++; |
| 17-19 | * } |

| Line number | PC-position | Source program screen |
|---|---|---|

| Line number | PC-position | Source program screen |
|---|---|---|
| 19-1 | | * void Main() |
| 19-2 | | * { |
| 19-3 | | *     int nCnt,nMode = 0; |
| 19-4 | | *     for(; nCnt < MAX; nCnt++){ |
| 19-5 | | *         if(pData == NULL) break; |
| 19-6 | | *         *pData = 0; |
| 19-7 | | *     } |
| 19-8 |  | *     nMode++; |
| 19-9 | | *     bool bRet = Sub(); |
| 19-10 | | *     if(bRet == false)   nMode = 0; |
| 19-11 | | *     return; |
| 19-12 | | * } |
| 19-13 | | * |
| 19-14 | | * bool Sub() |
| 19-15 | | * { |
| 19-16 | | *     if(nMode < 0 || nMode > MODEMAX) |
| 19-17 | | *         nMode = 0; |
| 19-18 | | *     nMode++; |
| 19-19 | | * } |

DEBUGGING DEVICE AND METHOD AS WELL AS STORAGE MEDIUM

BACKGROUND OF THE INVENTION

The present invention relates to a debugging device for debugging a computer program and a debugging method for debugging a computer program as well as a storage medium storing a debugging program.

DESCRIPTION OF THE RELATED ART

The debugging device for debugging a computer program has a step execution function that the debugging device executes, one step, one or plural statements (instructions) of an advanced computer language such as an assembler language or a C-language with taking an interval for every steps. The step execution function may be classified into the following four steps in view of the unit of the step. FIG. 17 is a first conventional example of a source program for describing each step execution function of the conventional debugging device. FIG. 18 is a second conventional example of a source program for describing each step execution function of the conventional debugging device. FIG. 19 is a third conventional example of a source program for describing each step execution function of the conventional debugging device.

(1) Step-in Execution

The step-in execution is to execute one statement in one step. For a procedure call execution, the statement enters into the procedure and stops the execution of the statement. For example, in the first conventional example of the source program of FIG. 17, the step-in execution starts at a line 17-8 and the execution of the statement stops at a line 17-9. Similarly, in sequence of a line 17-16, a line 17-17, a line 17-18, and a line 17-10, the execution of the statement stops.

(2) Step-over Execution:

The step-over execution is to execute one statement in one step. Even in a procedure call execution, the one statement is executed and stopped in the one step. For example, in the first conventional example of the source program of FIG. 17, the step-over execution starts at the line 17-8, and in sequence of a line 17-9, a line 17-10, and a line 17-11, the execution of the statement stops.

(3) Step-out Execution:

The step-out execution is that if the execution is started from a statement in a procedure, then all of the remaining statements in this procedure are executed in one step, and the executions of the statements are stopped at a next statement after that procedure has been called. For example, in the first conventional example of the source program of FIG. 17, the step-out execution starts at the line 17-16, and the execution of the statement stops at the line 17-10.

(4) Execution Prior to Cursor Line:

There is executed one step defined from the current position of a program counter to a statement prior to a position of a cursor displayed on a display device. The execution of the statement is stropped at a statement of the cursor position. For example, in the second conventional example of the source program of FIG. 18, the program counter is positioned at a line 18-3 and the cursor is positioned at a line 18-8. In this case, after a statement at the line 18-3 has been executed, then statements from a line 18-4 to a line 18-7 are executed the max number times and then the execution of the statement is stopped at the line 18-8.

In the third conventional example of the source program of FIG. 19, the program counter is positioned at a line 19-8 and the cursor is positioned at a line 19-10. In this case, in sequences of a line 19-8, a line 19-9, a line 19-16, a line 19-17 and a line 19-18, individual statements are executed and then the execution of the statement is stopped at the line 19-10.

For the above first to third step execution functions, for example, the step-in execution, the step-over execution and the step-out execution, it is necessary to repeat manual operations for selecting which statement is executable depending upon a position of the statement from which the step-execution is started. In FIG. 17, for example, if the execution of the statement is started from the line 17-9, then both the step-in execution and the step-over execution are selectable whilst the step-out execution is unselectable.

Except for the execution of the procedure instruction in the step-in execution or instructions in the procedure, one statement is executed in the one step. For which reason, it is necessary for operator to operate the same number of operations as the instructions or statements to be executed. For example, in FIG. 17, if the step-in execution is started from the statement at the line 17-4, then it is necessary to operate the same number of operations as the max number from the line 17-4 to the line 17-6.

In order to solve the above problem, it is possible that the step-execution is made prior to the cursor line as described in the above fourth step execution. For example, in FIG. 17, the cursor is positioned at the line 17-8, so that the statements from the line 17-4 to the previous line to the cursor line are executed. In this case, the executions are repeated the same number as the max number from the line 17-4 to the line 17-6 before the execution of the statement is stopped at the line 17-8. In this case, however, it is necessary for the operator to set, for every times, the cursor positions at the positions of statements where the executions are intended to be stopped.

As described above, the above described first to third step-execution functions are disadvantageous in inconvenience for the operator to select which statement is executable for every time. The above described fourth step-execution function is also disadvantageous in inconvenience for the operator to set, every time, the cursor positions in accordance with the statement positions. Consequently, the conventional step-execution functions of the conventional debugging device need complicated and inconvenient debugging operations.

Meanwhile, the normal debugging device has a display function for displaying source programs to be debugged on a display screen. The conventional debugging device allows less number of source program codes to be concurrently displayed on the display screen. This makes it difficult for the operator to have an accurate grasp of the flow of the processes. This disadvantage is caused by the fact that many windows are opened on the single display screen, wherein each window has a small size or a narrow width and a small number of the lines, and also the other fact that the source program is simply displayed on the display screen.

It is, therefore, necessary for the operator to operate unnecessary processes irrelevant from the debugging process for the program, for example, printing the source program on a paper or changing a window-displayed range of the source program by operating a scroll bar in level to confirm the entire of the source program to be debugged. This unnecessary processes irrelevant from the debugging process disturbs the operator's consideration and also causes time-consumption for the debugging process.

In the above circumstances, it had been required to develop a novel debugging device for debugging a computer program and a novel debugging method for debugging a computer program as well as a storage medium storing a novel debugging program free from the above problem.

SUMMARY OF THE INVENTION

Accordingly, it is an object of the present invention to provide a novel debugging device for debugging a computer program free from the above problems.

It is a further object of the present invention to provide a novel debugging device for debugging a computer program, which provides an improved step-execution function capable of facilitating debugging operations.

It is a still further object of the present invention to provide a novel debugging method for debugging a computer program free from the above problems.

It is yet a further object of the present invention to provide a novel debugging method for debugging a computer program, which provides an improved step-execution function capable of facilitating debugging operations.

It is further more object of the present invention to provide a storage medium storing a novel debugging program free from the above problems.

It is moreover object of the present invention to provide a a storage medium storing a novel debugging program, which provides an improved step-execution function capable of facilitating debugging operations.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

FIG. 6 is a view illustrative of an example of the step-execution in the embodiment of the present invention.

FIG. 7 is a view illustrative of an example of the step-execution in the embodiment of the present invention.

FIG. 9 is a view illustrative of an example of the step-execution in the embodiment of the present invention.

FIG. 10 is a view illustrative of an example of the step-execution in the embodiment of the present invention.

FIG. 11 is a view illustrative of an example of the step-execution in the embodiment of the present invention.

FIG. 13 is a view illustrative of an example of the step-execution in the embodiment of the present invention.

FIG. 17 is a view illustrative of an example of a source program to be step-executed in the prior art.

DISCLOSURE OF THE INVENTION

Figure 1:
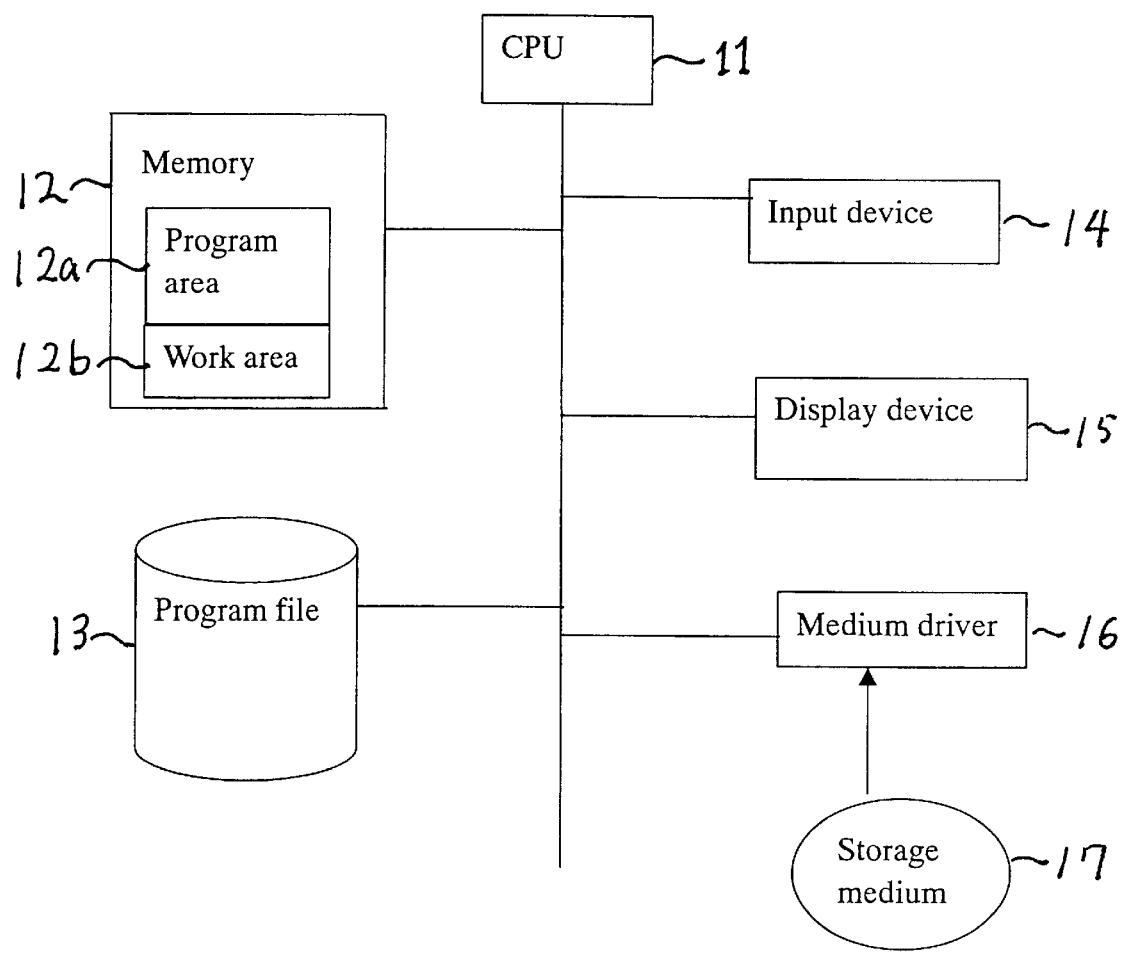
FIG. 1A is a block diagram illustrative of a computer system realizing a debug device in an embodiment of the present invention.
FIG. 1B is a schematic view illustrative of configurations of processes to be executed by the debugging device in a first embodiment in accordance with the present invention.
Figure 1:
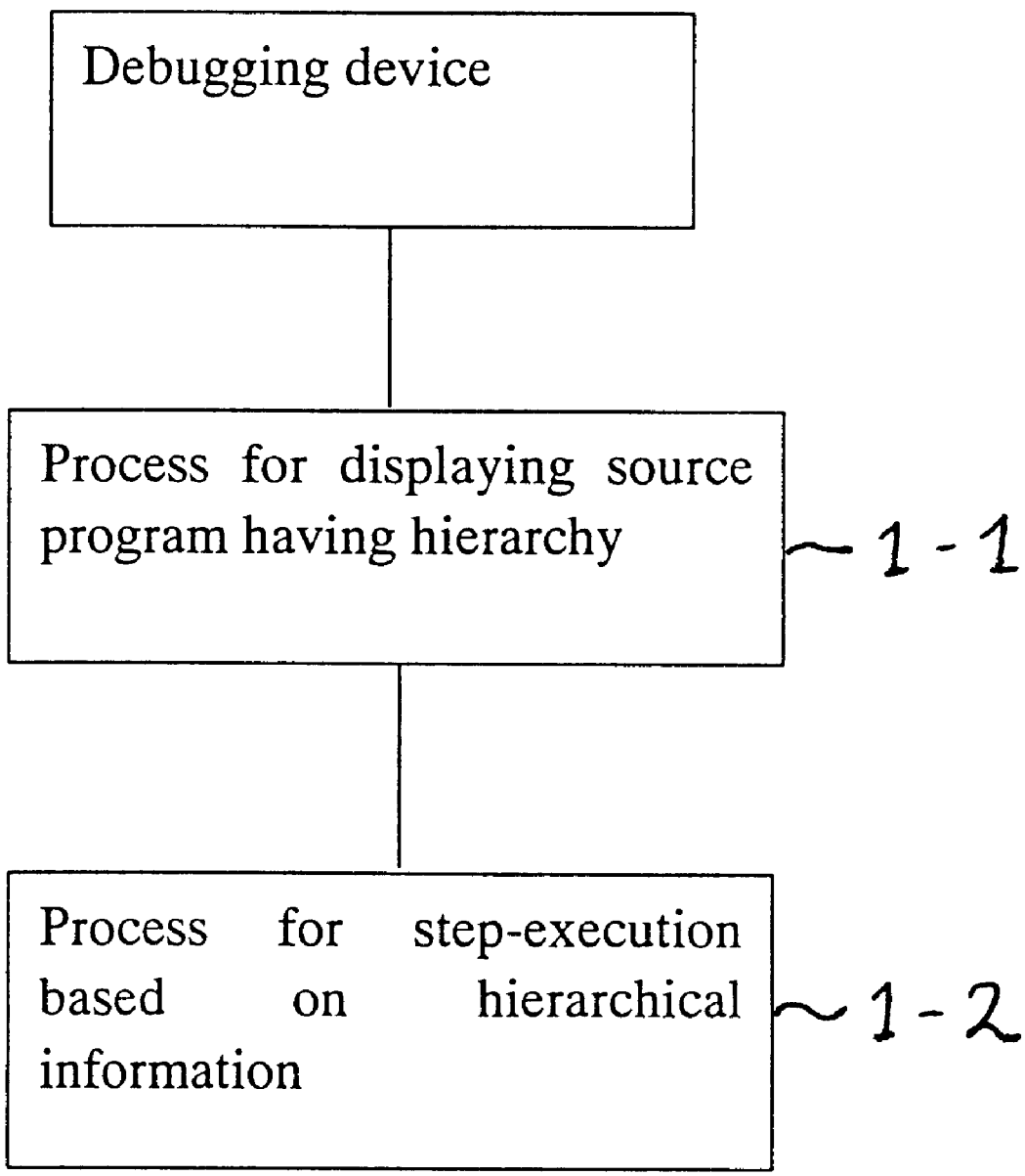

The first present invention provides a novel device for debugging a program comprising: a memory unit for storing a program having a hierarchical structure to be debugged; a display unit for displaying the program stored in the memory; a display state control unit for controlling the display unit to place individual statements included in the program in selected one of first and second display states; and a step-execution unit for performing a step-execution of the program to be debugged in accordance with the selected one of the first and second display states.

In accordance with the novel debugging device, the step-execution of the program to be debugged is performed in accordance with the selected one of the first and second states by the display state control unit. It is, for example, possible that statements at lines placed in the first display state are step-executed in one step, wherein if other statement of any low level hierarchy in the second display state is included in any of the lines placed in the first display state, then the other statement is also step-executed in the one step. This means it possible that not only the statements in the procedure but also other statements outside the procedure are executed on the one step, wherein it is necessary for the operator to set or control the display state only one time for sequential steps. It is unnecessary for the operator to set positions where the program is to be stopped for each step.

It is also possible that the above display state control unit makes the display unit to display but only selected statements in the program to be debugged, wherein the operator needs to draw an attention to the selected statements. This means it easy for the operator to overview the entire of the program during the debugging processes.

Consequently, the above novel debugging device makes it easy for the operator to operate the debugging processes.

It is preferable that the first display state is a state that the statements are displayed by the display unit, whilst the second display state is a state that the statements are not displayed by the display unit.

It is also preferable that the memory stores not only the program but also each of the first and second display states of the statements. In this case, it is further preferable that the step-execution unit performs the step-execution of the program to be debugged with reference to individual ones of the first and second display states of the statements stored in the memory.

It is also preferable that the step-execution unit performs the step-execution of the statement including a lower level hierarchy placed in the second step in one step prior to a statement having a hierarchy placed next in the first display state.

It is also preferable that the program to be debugged includes at least an index line having a low level hierarchy, at least a low-leveled hierarchical line under the index line and normal lines. In this case, it is further preferable that the display unit displays individual statements of the programs together with predetermined codes which indicate individual kinds of the statements.

It is also preferable that the display unit displays the individual statements at displaced position in level in accordance with individual hierarchies.

It is also preferable that the display unit displays individual statements of the programs together with predetermined codes which indicate that the step-execution is now on performance by the step-execution unit. In this case, it is further preferable that the display unit displays individual statements of the programs together with different codes from the codes which indicate the kinds of the statements if the step-execution unit performs the step-execution of the index line or the low level hierarchical lines placed in the non-displayed state.

The above novel debugging device allows the operator to overview the entire of the program and also easily recognize the line which is now on the step-execution. Namely, the above novel debugging device makes it easy for the operator to perform the debugging operations.

The second present invention provides a method of debugging a program comprising the steps of: displaying a program having a hierarchical structure to be debugged; controlling the display step to place individual statements included in the program in selected one of first and second display states; and performing a step-execution of the program to be debugged in accordance with the selected one of the first and second display states.

It is preferable that the step-execution step performs the step-execution of the statement including a lower level hierarchy placed in the second step in one step prior to a statement having a hierarchy placed next in the first display state.

The above novel debugging method allows the operator to overview the entire of the program and also easily recognize the line which is now on the step-execution. Namely, the above novel debugging device makes it easy for the operator to perform the debugging operations.

The third present invention provides a computer program for debugging a program, and the computer program comprises the steps of: displaying a program having a hierarchical structure to be debugged; controlling the display step to place individual statements included in the program in selected one of first and second display states; and performing a step-execution of the program to be debugged in accordance with the selected one of the first and second display states.

It is preferable that the step-execution step performs the step-execution of the statement including a lower level hierarchy placed in the second step in one step prior to a statement having a hierarchy placed next in the first display state.

The above novel debugging program allows the operator to overview the entire of the program and also easily recognize the line which is now on the step-execution. Namely, the above novel debugging device makes it easy for the operator to perform the debugging operations.

PREFERRED EMBODIMENT

A first embodiment according to the present invention will be described in detail with reference to the drawings. FIG. 1(a) is a block diagram illustrative of a computer system on which a novel debugging device is realized in accordance with the present invention. The novel debugging device is realized on a computer system of FIG. 1(a). The computer system has a CPU 11, a memory 12, a program file 13, an input device 14, a display device 15 and a storage medium driver 16 for driving a storage medium 17.

The CPU 11 executes a debug program for performing a debug process of a source program. Any programs necessary for executing the debug processes will hereinafter be referred to as a debug program. The memory 12 comprises a program area 12a storing the debug program to be executed by the CPU 11, and a work area 12b temporary storing data during the execution of the debug program by the CPU 11.

The program file 13 stores the source program to be debugged by the CPU 11. The program file 13 may be realized over a secondary storage device. The source program stored in the program file 13 has a hierarchical structure of instructions or statements. The most significant hierarchy comprises a single hierarchy. As the level of the hierarchy is dropped one by one, then the number of hierarchy is increased one by one. The input device 14 is used by the operator to input or enter the instructions or statements for execution of the debug process. The display device 15 displays the source program to be debugged during the debug process.

The storage medium driver 16 drives the storage medium 17 for reading out the debug program from the storage medium 17 and transferring the read out debug program to the program area 12a of the memory device 12 for allowing the CPU 11 to execute the debug process in accordance with the debug program. The storage medium 17 may comprise any available medium such as a magnetic disk, an optical disk, an optical magnetic disk or a non-volatile semiconductor memory device.

The debugging device performs the step-execution as follows. FIG. 1(b) is a flow chart illustrative of steps of the step-execution performed by the debugging device of FIG. 1(a). In a step 1-1, a source program having a hierarchical structure is read out from the program file 13 and then displayed by the display device 15. In a step 1-2, the debugging device performs the step-execution of the source program on the basis of formations about the hierarchical structure of the source program.

Figure 16:
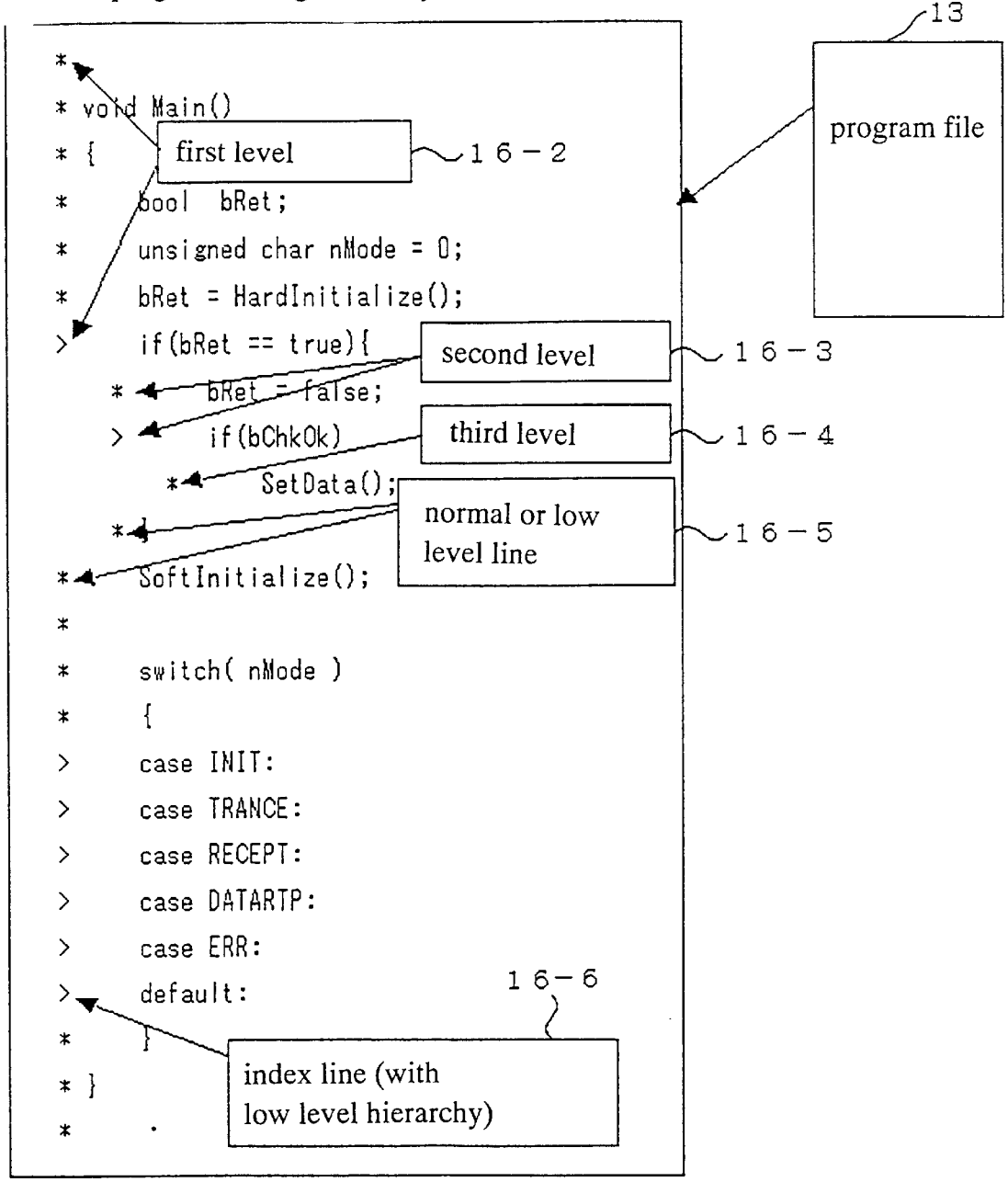
FIG. 16 is a schematic view illustrative of the hierarchy-program displayed as well as step-execution in the embodiment of the present invention.
Figure 18:
FIG. 18 is a view illustrative of an example of a source program to be step-executed in the prior art.
Figure 19:
FIG. 19 is a view illustrative of an example of a source program to be step-executed in the prior art.

FIG. 16 is a view illustrative of a source program having a hierarchical structure to be displayed on a display device and step-executions performed by the debugging device in accordance with the present invention. In the source program read out from the program file 13, individual lines belonging to the most significant hierarchy (the first level hierarchy) are displayed near to the left end. Individual lines belonging to the second level hierarchy are then displayed by the display device 15. Individual lines belonging to the third level hierarchy are subsequently displayed by the display device 15.

Positions of the codes "*" and " " represent individual levels of the hierarchy to which individual lines belong as referred by reference codes 16-2~16-4. If the left side code of each line is "*", then this represents either the normal line free of low level hierarchy or the low level hierarchy free of lower level hierarchy as referred by a reference code 16-5. If the left side code of each line is " ", then this represents the index line having a low level hierarchy as referred by a reference code 16-6.

The question of whether the a lower level hierarchy of the index line is placed in a display state or a non-display state may be judged depending upon whether the left-side code "*" or " " of the next line is leveled down.

The operations of the CPU 11 for performing the step-execution of the source program will be described. If the statement line instructing the commencement of the step-execution of the source program is marked with "*" at its left side and is the normal line or the low level hierarchy line, then the CPU11 executes this statement only and then discontinues the execution of the source program. If the statement line instructing the commencement of the step-execution of the source program is marked with " " at its left side and is the index line and further if the lower level hierarchy line of this index line is placed in the display state, then the CPU11 executes this index statement only and then discontinues the execution of the source program. If the statement line instructing the commencement of the step-execution of the source program is marked with " " at its left side and is the index line and further if the lower level hierarchy of this index line is placed in the non-display state, then the CPU11 executes not only this index statement but also plural statements included in the lower level hierarchy before the CPU11 discontinues the execution of the source program.

The following descriptions will focus on the operations performed by the debugging device of this embodiment will be described with reference to flow charts of FIG. 2 to FIG. 4.

Figure 2:
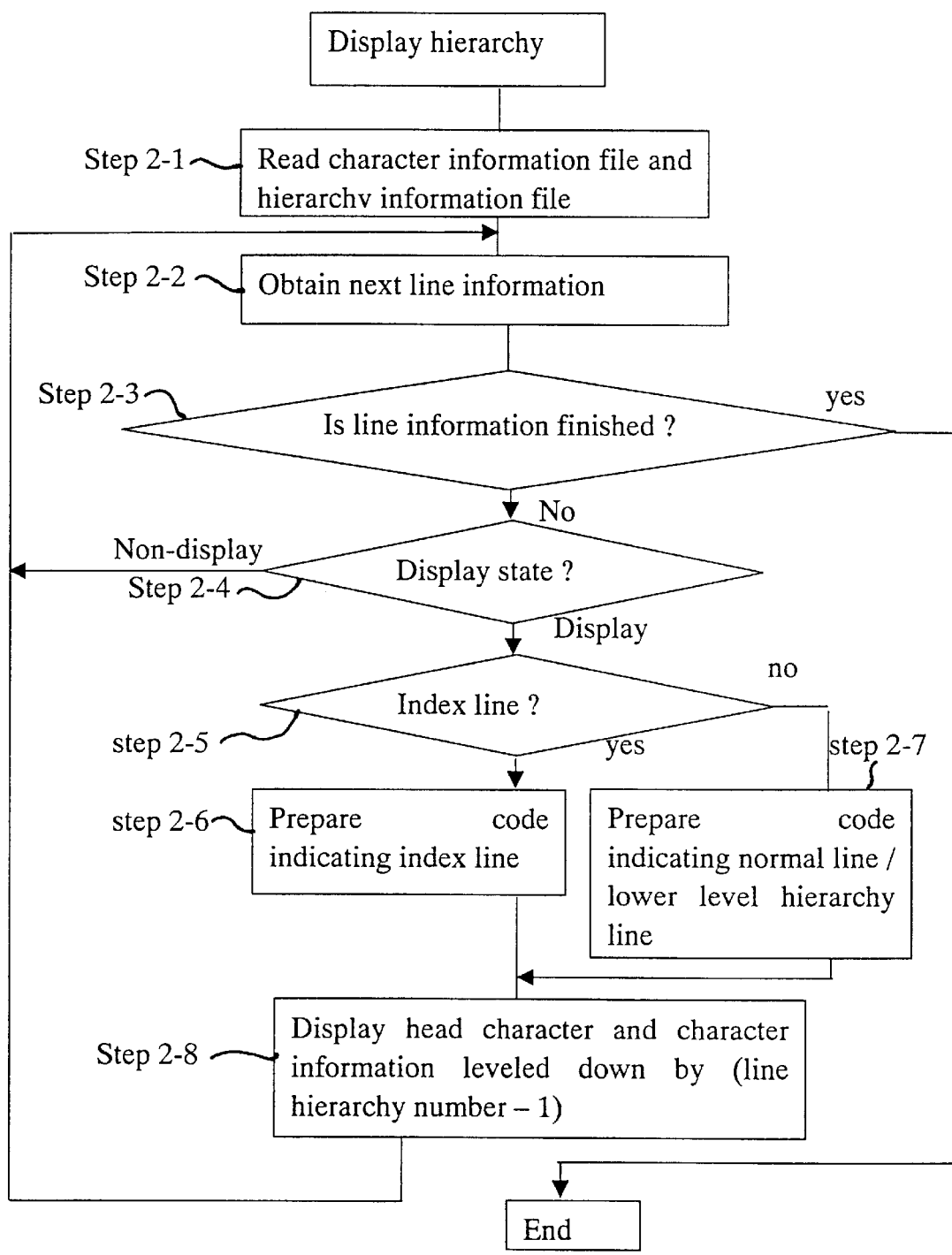
FIG. 2 is a flow chart illustrative in detail of processes for displaying source program having hierarchy shown in a step 1-1 of FIG. 1B.

FIG. 2 is a flow chart illustrative in detail of display processes for hierarchical source program shown in the step 1-1 of FIG. 1(b). The CPU 11 reads out line information of he source programs to be debugged from the program file 13 and stores the same into the work area 12b of the memory 12 (step 2-1). The line information include character information and hierarchy information set at a time of having prepared the program, and further include information about the display state to be set in the process which will be described later.

Subsequently, the CPU 11 fetches an information of a line to be next displayed on the display device 15 from the read out line information in the word area 12b (step 2-2). The CPU 11 judges whether or not the line information has been finished (step 2-3). If finished, then the processes of this flow chart are finished. If the line information has not yet been finished, then the CPU 11 investigates the information about the display state included in the fetched line information to judge whether this line is placed in the display state or the non-display state (step 2-4).

If the line is placed in the non-display state, then the process will return to the step 2-2, whereby the CPU 11 fetches the next line information. If the line is placed in the non-display state, then the CPU 11 judge whether this line is the index line or other line on the basis of the fetched line information (step 2-5).

If the line is the index line, then the CPU 11 prepares a code which indicates the index line (step 2-6) and the process will be progressed to the step 2-8. If the line is other line than the index line, then the CPU 11 prepares another code which indicates the normal line other than the index line (step 2-7) and the process will be progressed to the step 2-8. In the step 2-8, the CPU 11 performs the level down of the characters by the number of hierarchy of this line to be displayed, so as to make the display device 15 display this line, and then the process will be returned to the step 2-2.

Figure 3:
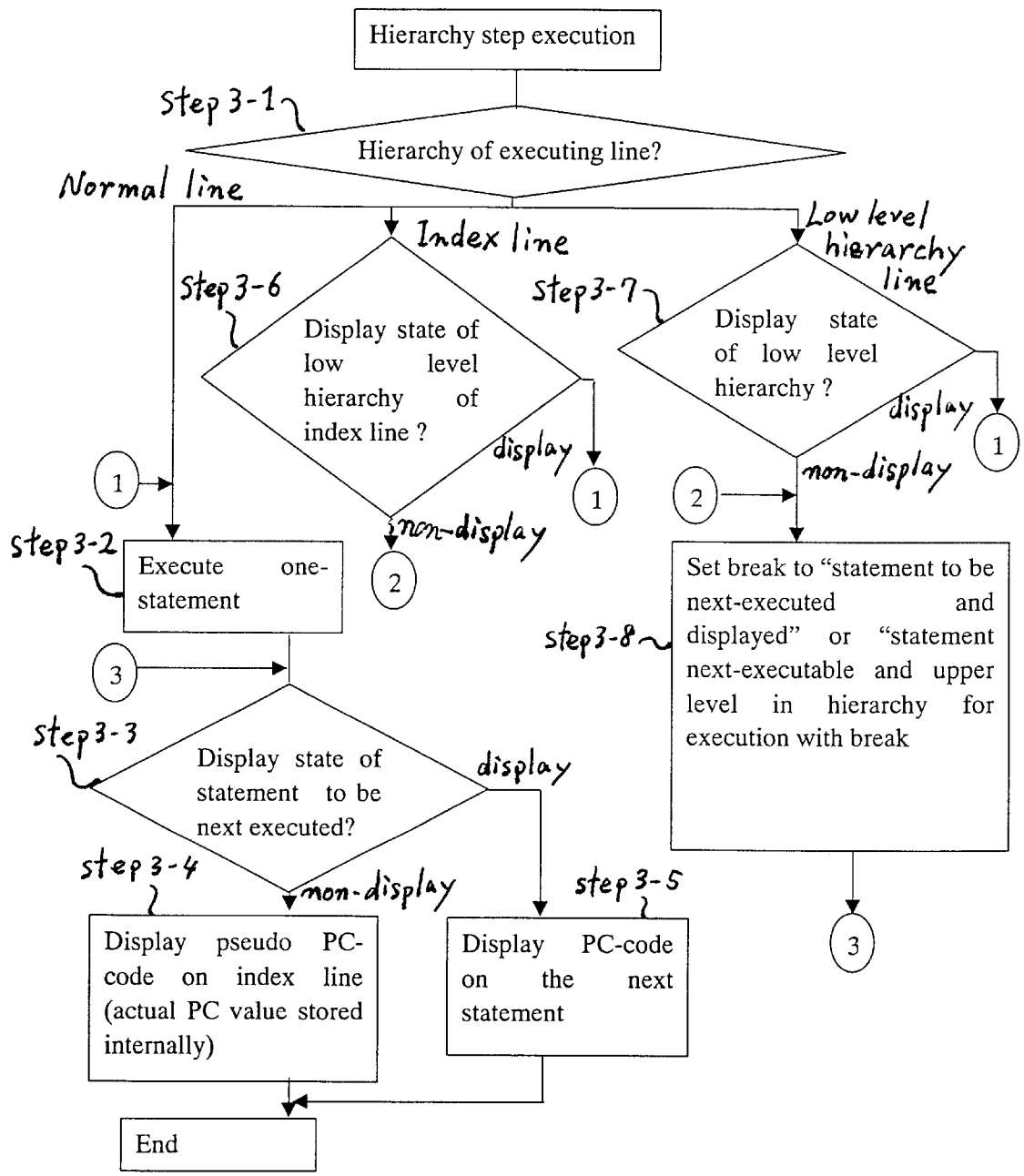
FIG. 3 is a flow chart illustrative in detail of a step-execution on the basis of hierarchical information shown in a step 1-2 of FIG. 1B.

FIG. 3 is a flow chart illustrative in detail of the step-execution process on the basis of the hierarchy information shown in the step 1-2 of FIG. 1(b). The operator operates the input device 14 to send the instruction of the step-execution to the CPU 11 to commence the processes of that flow chart. For commencement of the step-execution at first time, the operator operates the input device 14 to designate the start line. At this time, the start line is marked with a PC-code and displayed on the display device 15, wherein if the start line is the index line and the lower level hierarchy is placed in the non-display state, then the start line is marked with a pseudo PC-code.

The CPU 11 judges the hierarchy state of the statement on a line to be executed, for example, the designated commencement line if the process is just started (step 3-1). If the statement line is the most significant line and has no lower level hierarchy, then the process is progressed to the step 3-2. If the statement line is the index line having the lower level hierarchy, then the process is progressed to the step 3-6. If the statement line is any low level hierarchy line other than the most significant line and being free of the index line, then the process is progressed to the step 3-7.

In the step 3-2, the CPU 11 executes the one statement of the normal line marked with the PC-code and then the process is progressed to the step 3-3. In the step 3-3, the CPU 11 judges whether the line including the statement to be executed following to the statement already executed in the step 3-2 is placed in the display state or the non-display state.

If placed in the non-display state, the CPU 11 puts the pseudo PC-code to the index line higher in hierarchy than the line which includes the statement to be subsequently executed in order to display the same on the display device 15 (step 3-4). The process of this flow chart is finished to wait for next input of the commencement instruction or statement from the input device 14. If placed in the display state, then the CPU 11 puts the PC-code to the line which includes the statement to be subsequently executed in order to display the same on the display device 15 (step 3-5). The process of this flow chart is finished to wait for next input of the commencement instruction or statement from the input device 14.

In the step 3-6, the CPU 11 judges whether or not the lower level hierarchy line than the index line is set in the display state or the non-display state. If set in the display state, then the process is progressed to the above-described step 3-2. If set in the non-display state, then the process is progressed to the step 3-8.

In the step 3-7, the CPU 11 judges whether or not this low level hierarchy line is set in the display state or the non-display state. If set in the display state, then the process is progressed to the above-described step 3-2. If set in the non-display state, then the CPU 11 sets a break to the statement to be subsequently executed and displayed on the display device 15 or other executable statement of the higher level hierarchy than this statement, for subsequent execution up to the line prior to the line including the statement set in the break and then discontinues the execution prior to the line including the statement (step 3-8). The process is progressed to the step 3-3.

Figure 4:
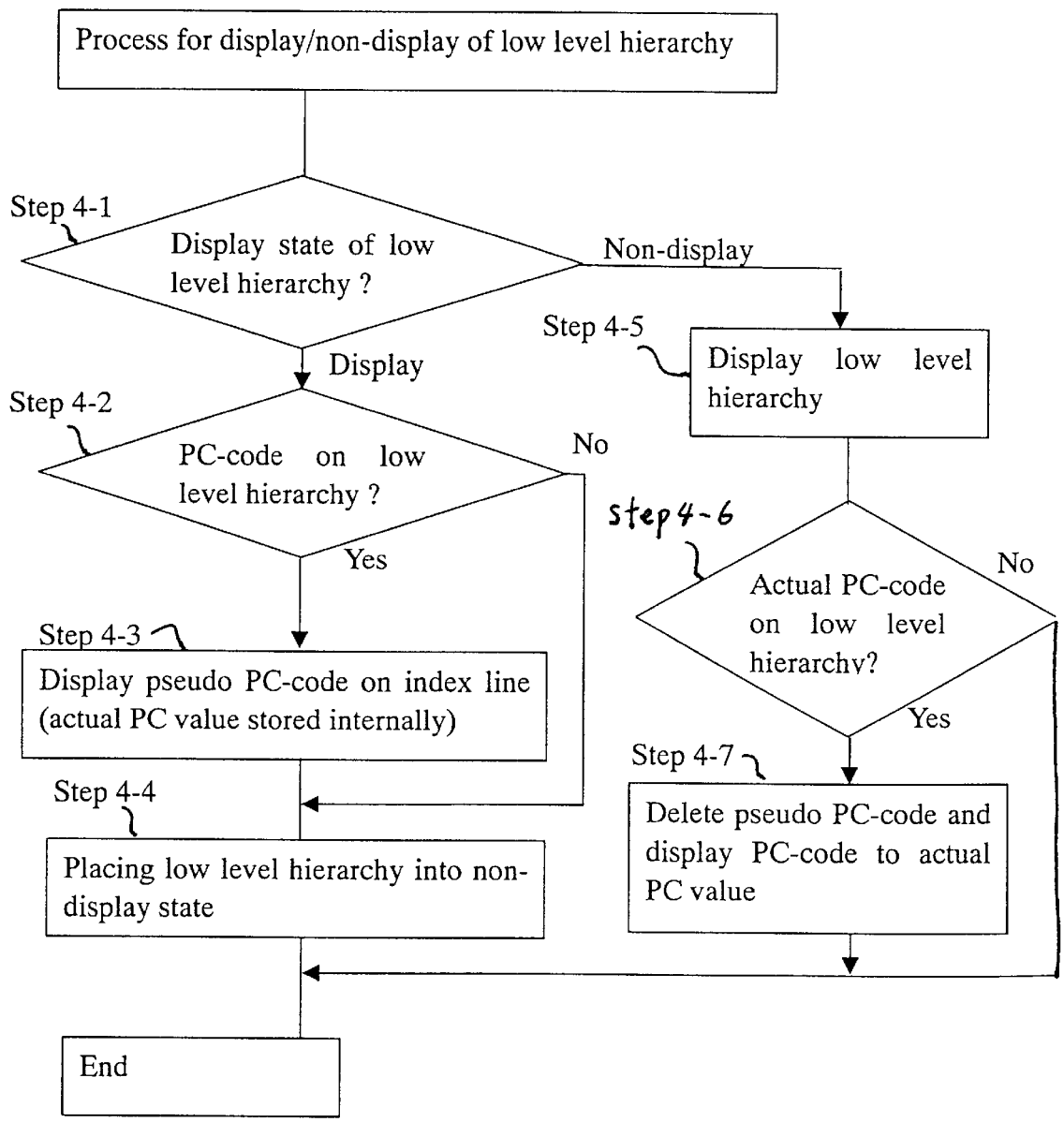
FIG. 4 is a flow chart illustrative of processes for switching display state of lower level hierarchy.

FIG. 4 is a flow chart illustrative of the process for switching the display state of the low level hierarchy, wherein the PC-code is marked to the index line or the low level hierarchy line. The descriptions are concerned with when the low level hierarchy line indicated with the PC-code is switched from the display state into the non-display state as well as when the low level hierarchy line of the index line with the PC-code is switched from the non-display state into the display state. The process of the flow chart is commenced upon a predetermined input from the input device 14 for switching the display.

The CPU 11 judges whether or not the lower level hierarchy line of the index line marked with the PC-code or the lower level hierarchy line marked with the PC-code is placed in the display state or the non-display state (step 4-1). If the lower level hierarchy line is in the display state, then the CPU 11 further judges whether or not the PC-code is put to the lower level hierarchy line than the index line (4-2).

If the PC-code is displayed on the lower level hierarchy line, then the CPU 11 puts the pseudo PC-code to the index line of the higher level than the lower level hierarchy line marked with the PC-code in order to display the same on the display device 15 (4-3). In this time, the position of the PC-code or the lower level hierarchy line which had originally been marked with the PC-code is then stored in the system. The process is then progressed to the step 4-4.

If the PC-code is not marked to the lower level hierarchy line, then the display on the display device 15 is not changed and the process is then progressed to the step 44.

In the step 4-4, the CPU 11 display the source program on the display device 15, whilst the lower level hierarchy line is in the non-display state. All of the lines having the same level hierarchy as the lower level hierarchy line are not displayed on the display device 15. The CPU 11 stores information indicating, that the lower level hierarchy line has just been placed in the non-display state, into the program file 13 and then the process of this flow chart is completed.

If the lower level hierarchy line is in the non-display state in the step 4-1, then the CPU 11 places the lower level hierarchy line of the index line into the display state to display the same on the display device 15 (step 4-5). Subsequently, the CPU 11 judges the whether or not the position of the PC-code internally stored is on the lower level hierarchy line (step 4-6).

If the actual PC-code position is on the lower level hierarchy line, then the CPU 11 delete the pseudo PC-code marked to the index line to which the lower level hierarchy line is pendant, then the PC-code is putted at a position of the actual PC-code stored internally to display the same on the display device 15. The process is then finished. If the position of the actual PC is not on the lower level hierarchy line, then no change appears on the display on the display device 15. The process of this flow chart is then finished.

If the pseudo PC-code is putted to the index line in the above processes, it is possible to differentiate the pseudo PC-code in the size, shape and color from the PC-code for making remarkable what the lower level hierarchy line of the index line marked with the pseudo PC-code is placed in the non-display state.

Figure 5:
FIG. 5 is a view illustrative of an example of the step-execution in the embodiment of the present invention.

The processes of the debugging device of this embodiment will further be described in detail with reference to FIGS. 5 to 15. In FIGS. 5 and 6, if the value of X has a correspondence at line *–X, where * is identical with the number in the drawing and X is the line number), then this represents the same line. This is common to FIGS. 7–9, and FIGS. 10–12, and FIGS. 13–15.

EXAMPLE 1

In this example, the source program having hierarchical structure as shown in FIG. 5 is stored in the program file 13, wherein the display or non-display state is set to the each hierarchy, so that this source program is then step-executed as the program to be subjected to the debugging process.

The CPU 11 reads out the source program from the source program 13 and stores the same into the work area 12b of the memory 12 (step 2-1). The CPU 11 obtains information about the 5-1 line as the heat line from the work area 12b (step 2-2). The CPU 11 judges whether or not any further line information is present (step 2-3).

The CPU 11 judges whether or not the obtained 5-1 line is in the display state (step 2-4). Since, however, the 5-1 line is in the display line, the CPU 11 judges whether or not this is the index line (step 2-5). Since the 5-1 line is the normal line but not the index line, then the CPU 11 prepares a code which indicates the normal line or the low level hierarchy line (step 2-7).

The CPU 11 displays the line 5-1 on the display device 15. Since the 5-1 line is on the first level hierarchy, the line 5-1 is displayed on the display device 15 together with the code indicating the normal line prepared in the step 2-7 without falling the position of the characters (step 2-8). Subsequently, the process will return to the step 2-2, so that the same processes as described will be executed up to the line 5-4 for displaying the same on the display device 15.

The CPU 11 obtains information of a line 5-5 (step 2-2), where the line information is not finished (step 2-3), and the line 5-5 is in the display state (step 2-4). The CPU 11 judges whether or not the line 5-5 is the index line (step 2-5). Since the line 5-5 is the index line, then the CPU 11 prepares the code which represents the index line (step 2-6).

Subsequently, the CPU 11 displays the line 5-5 on the display device 15. Since the line 5-5 is on the first level hierarchy, the line 5-5 is displayed on the display device 15 together with the code representing the index line prepared in the step 2-6 without falling the position of the characters (step 2-8). Subsequently, the process will return to the step 2-2.

The CPU 11 obtains information of a line 5-6 (step 2-2), where the line information is not finished (step 2-3), and the line 5-6 is in the display state (step 2-4). The CPU 11 judges whether or not the line 5-6 is the index line (step 2-5). Since the line 5-6 is the index line, then the CPU 11 prepares the code which represents the index line (step 2-6).

Subsequently, the CPU 11 displays the line 5-6 on the display device 15. Since the line 5-6 is on the second level hierarchy, the line 5-6 is displayed on the display device 15 together with the code representing the index line prepared in the step 2-6 with falling the position of the characters by one character (step 2-8). Subsequently, the process will return to the step 2-2.

The CPU 11 obtains information of a line 5-7 (step 2-2), where the line information is not finished (step 2-3), and the line 5-7 is in the non-display state (step 2-4). The CPU 11 does not display the same. Subsequently, the process will return to the step 2-2.

The CPU 11 performs the necessary operations for displaying a line 5-8 on the display device 15 in accordance with the above steps 2-3 to 2-8. These processes will be repeated until the completion of the line information is confirmed in the step 2-3.

Subsequently, the description will focus on when the step-execution is made the lower level hierarchy lines (5-6 to 5-9) of for-instruction as one step. In this case, the for-instruction lower level hierarchy lines (5-6 to 5-9) are placed in the non-display state, where the PC-code is positioned at the line 5-5. The operator enters the predetermined instruction or statement for switching the display/non-display states through the input device 14.

The CPU 11 confirms whether or not the lower level hierarchy lines (5-6 to 5-9) of the line 5-5 is in the display state or the non-display state (step 4-1). The lines 5-6 to 5-9 are in the display state. The CPU 11 judges whether or not the PC-code has the actual position for the lower level hierarchy lines (5-6 to 5-9) of the line 5-5 (step 4-2).

Since the PC-code is not put to the lower level hierarchy lines (5-6 to 5-9), the CPU 11 makes the PC-code remains at this position on the display device 15 to place the lower level hierarchy lines (5-6 to 5-9) in the non-display state so that the source program exclusive of the lower level hierarchy lines (5-6 to 5-9) is displayed on the display device 15 (step 4-4). FIG. 6 is illustrative of the non-display state in which the lower level hierarchy lines (5-6 to 5-9) of the index line 5-5 are placed.

Subsequently, the step-execution to be made in this state will be described with reference to FIG. 6. The PC-code is on the line 6-5. The CPU 11 judges the hierarchical state of the line 6-5 to be executed (step 3-1). Since the line 6-5 is the index line having the lower level hierarchy, then the CPU 11 judges whether the lower level hierarchy lines (5-6 to 5-9) are placed in the display state or the non-display state (step 3-6).

Since the lower level hierarchy line of the line 6-5 is in the non-display state, then the CPU 11 sets a break to a line 6-10 of a statement displayed and to be executed subsequently. The execution with break is made prior to the line 6-10 or from the line 6-5 with the PC-code until the line 5-9 having the lower level hierarchy than that and placed in the non-display state (step 3-8).

The CPU 11 judges whether the line 6-10 as the statement to be executed subsequently is placed in the display state or the non-display state (step 3-3). Since the line 6-10 is in the display state, the CPU 11 moves the PC-code to the line 6-10 as the statement to be executed subsequently for displaying the same on the display device 15 (step 3-5), so that it is possible to make the step-execution of the plural statements by one step.

EXAMPLE 2

In this example, the source program having the hierarchical structure as shown in FIG. 7 is stored in the program file 13 where the display/non-display state is set for each hierarchy. The source program is subjected to the step-execufion as the program to be debugged. In FIG. 7, the index line 7-6 is a comment line free of the statement.

If as shown in FIG. 7, the PC-code is on the line 7-5 and the lower level hierarchy lines (7-7 to 7-10) to be executed subsequently by one step, then the lower level hierarchy lines (7-7 to 7-10) lower in hierarchy than the index line 7-6 are placed in the non-display state.

In this case, the CPU 11 confirms whether the lower level hierarchy lines (7-7 to 7-10) lower in hierarchy than the index line 7-6 are placed in the display state or the non-display state (step 4-1). Since the lines 7-7 to 7-10 are in the display state, the CPU 11 judges whether or not the PC-code is positioned at the actual position for the lower level hierarchy lines (7-7 to 7-10) on the display device 15 (step 4-2).

Since the lower level hierarchy lines (7-7 to 7-10) are free of the PC-code, then the CPU 11 makes the PC-code remain in position on the display device 15 and places the lower level hierarchy lines 7-7 to 7-10 in the non-display state, in order to display source program exclusive of the lower level hierarchy lines (7-7 to 7-10) on the display device 15 (step 4-4).

Figure 8:
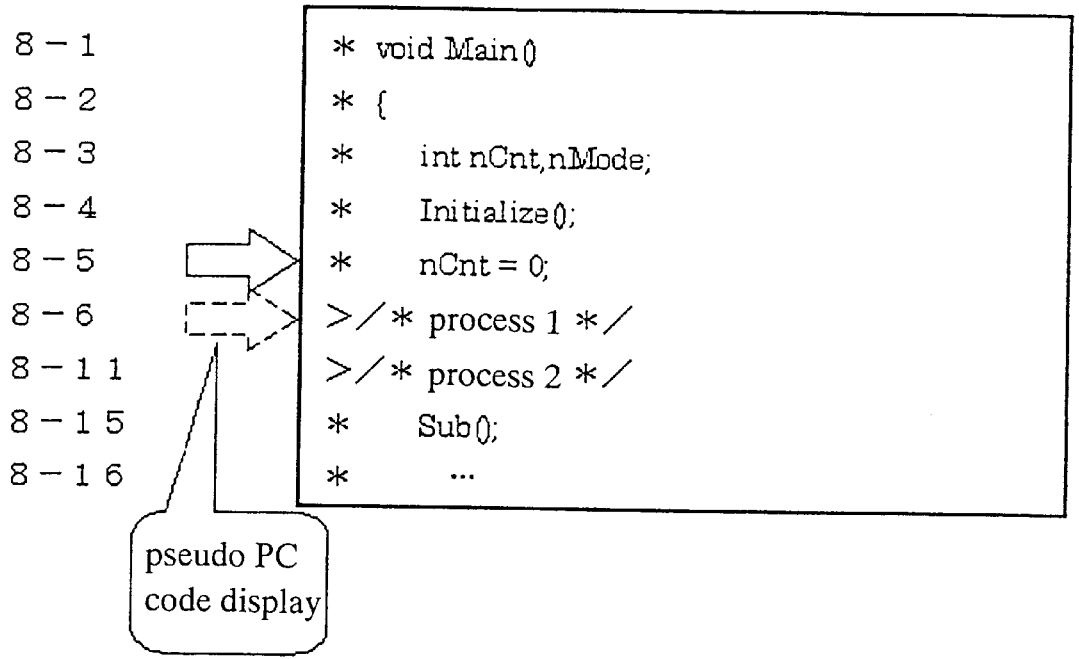
FIG. 8 is a view illustrative of an example of the step-execution in the embodiment of the present invention.

Similarly, lower level hierarchy lines (7-12 to 7-14) of the line 7-11 are also placed in the non-display state in the same manner. FIG. 8 is illustrative of a state where the lower level hierarchy lines (7-7 to 7-10) of the index line 7-6 are placed in the non-display state.

The step-execution to be executed in this state will be described with reference to FIG. 8. The PC-code is on the line 8-5. The CPU 11 confirms the hierarchical state of the line 8-5 to be step-executed step (3-1). Since the line 8-5 is the normal line free of any lower level hierarchy line, then the CPU 11 executes a statement "nCnt" of the line 8-5 by one step (step 3-2).

Since the next line 8-6 is the comment line, the CPU 11 judges whether the statement of the line 8-7 to be executed subsequently is in the display state or the non-display state (step 3-3). Since the line 8-7 is in the non-display state, the CPU 11 stores the position of the actual PC-code indicating the position of the line 8-7 into the work area 12b so that the CPU 11 displays the source program on the display device 15 where the pseudo PC-code of waved line is put to the line 8-6 as shown in FIG. 8 (step 3-4).

The operator further enters the statement or instruction for the step-execution through the input device 14. Since the line 8-6 with the pseudo PC-code is the index line, then the CPU 11 judges the hierarchical state of the statement of the line 8-7 to be executed subsequently (step 3-1). Since the line 8-7 is in the non-display state, the CPU 11 sets a break to the statement of the line 7-12 higher in hierarchy than the line 8-7 and to be executed subsequently for performing the execution with break (step 3-8), wherein the line 7-12 is in the non-display state in FIG. 8.

The CPU 11 judges whether the statement of the line 7-12 to be executed subsequently is in the display state or the non-display state (step 3-3). Since the line 7-12 is in the non-display state, then the CPU 11 puts the pseudo PC-code on the line 8-11 (step 3-4). Namely, as shown in FIG. 9, the source program is displayed on the display device 15 wherein the pseudo PC-code is put on the line 9-11. As described above, if the index line is the comment line, the step-execution is executable.

EXAMPLE 3

In this example, the source program having the hierarchical structure as shown in FIG. 10 is stored in the program file 13 where the display/non-display state is set for each hierarchy. The source program is subjected to the step-execution as the program to be debugged. A line 10-6 marked with the PC-code is lower in hierarchy than an index line 10-5.

If, as shown in FIG. 10, the PC-code is on the line 10-6 lower in hierarchy than the index line 10-5. If the lower level hierarchy lines (10-6 to 10-19) lower in hierarchy than the index line 10-5 of an if-statement or if-instruction are executed by one step, then the lower level hierarchy lines (10-6 to 10-19) are placed in the non-display state.

In this case, the CPU 11 confirms whether the lower level hierarchy lines (10-6 to 10-19) lower in hierarchy than the index line 10-5 are placed in the display state or the non-display state (step 4-1). Since the lines 10-6 to 10-19 are in the display state, the CPU 11 judges whether or not the PC-code is positioned at the actucal position for the lower level hierarchy lines (10-6 to 10-19) on the display device 15 (step 4-2).

Since the lower level hierarchy line 10-6 has the PC-code, then the CPU 11 stores the actual position of the PC-code indicating the line 10-6 into the work area 13b and puts the pseudo PC-code to the line 10-5 (step 4-3). The CPU 11 sets the lower level hierarchy lines 10-6 to 10-19 in the non-display state, in order to display source program exclusive of the lower level hierarchy lines (10-6 to 10-19) on the display device 15 (step 4-4). FIG. 11 is illustrative of the non-display state of the lower level hierarchy lines (10-6 to 10-19).

The step-execution to be executed in this state will be described with reference to FIG. 11. The CPU 11 confirms the hierarchical state of the line 10-6 to be step-executed step (3-1). Since the line 10-6 is the lower level hierarchy line, then the CPU 11 judges whether this lower level hierarchy line is in the display state or the non-display state (step 3-7). Since the lower level hierarchy line is in the non-display state, the CPU 11 sets a break to the line 11-25, of which a statement of is subsequently executed and displayed for execution with break (step 3-8).

Figure 12:
FIG. 12 is a view illustrative of an example of the step-execution in the embodiment of the present invention.

The CPU 11 judges whether the statement of the line 11-25 to be executed subsequently is in the display state or the non-display state (step 3-3). Since the line 11-25 is in the non-display state, the CPU 11 moves the PC-code to the line 11-25, of which the statement is subsequently executed for displaying the same on the display device 15 (step 3-5), whereby other than procedures, plural statements are step-out executable by one step. FIG. 12 is illustrative of the state of the source program displayed on the display device 15.

With reference to FIGS. 10 and 11, descriptions are made to when the actual position of the PC-code is on the lower level hierarchy in the non-display state and then the non-display state is switched to the display state. In FIG. 11, the pseudo PC-code is set on the line 11-5. In this state, the operator enters a predetermined statement for switching the display/non-display state through the input device 14.

The CPU 11 confirms whether the lower level hierarchy lines (11-6 to 11-19) lower in hierarchy than the line 11-5 marked with the pseudo PC-code are placed in the display state or the non-display state (step 4-1). Since the lower level hierarchy lines (11-6 to 11-19) are in the non-display state, they are switched to the display state for displaying the same on the display device 15.

The CPU 11 judges whether or not the lower level hierarchy lines (11-6 to 11-19) lower in hierarchy than the line 11-5 have the position of the actual PC-code (step 4-6). Since the original PC-code is on the lower level hierarchy line 10-6. The CPU 11 deletes the pseudo PC-code of the line 11-5 (line 10-5) and in place puts the PC-code on the line 10-6 for displaying the source program on the display device 15 (step 4-7).

If the lower level hierarchy line is switched between the display state and the non-display state, the actual PC-code and the pseudo PC-code are used to display the source program on the display device 15 so as to realize the display of the line on the step-execution with the PC-code.

EXAMPLE 4

Figure 14:
FIG. 14 is a view illustrative of an example of the step-execution in the embodiment of the present invention.
Figure 15:
FIG. 15 is a view illustrative of an example of the step-execution in the embodiment of the present invention.

In this example, the source program having the hierarchical structure as shown in FIGS. 13 to 15 is stored in the program file 13 where all of the lines are placed in the display state. The source program is subjected to the step-execution as the program to be debugged.

In a state shown in FIG. 13, a line 13-6 marked with the PC-code is the index line which has lower level hierarchy lines 13-7 to 13-10. These lower level hierarchy lines (13-7 to 13-10) are placed in the display state. In this state, the operator operates the input device 14 to instruct the commencement of the step-execution.

The CPU 11 judges the hierarchical state of the line 13-6 marked with the PC-code (3-1). Since the line 13-6 is the index line having the lower level hierarchy lines, then the CPU 11 judges whether or not the lower level hierarchy lines (13-7 to 13-10) of the index line 13-6 are in the display state or the non-display state. Since the lower level hierarchy lines are in the display state, then the CPU 11 executes one statement of the line 13-16 (step 3-2).

The CPU 11 judges whether the statement of the line 13-7 to be executed subsequently is in the display state or the non-display state (step 3-3). Since the line 13-7 is in the display state, the CPU 11 moves the PC-code to the line 13-7 for displaying the source program on the display device 15 (step 3-5). FIG. 14 is illustrative of the source program displayed on the display device 15.

In the state shown in FIG. 14, the operator further operates the input device 14 to instruct the commencement of the step-execution. The CPU 11 judges the hierarchical state of the statement of the line 14-7 with PC-code to be executed subsequently (step 3-1). Since the line 14-7 is in the low level hierarchy line, the CPU 11 judges whether the line 14-7 is in the display line or the non-display line (step 3-7). Since the line 14-7 is in the display state, the CPU 11 executes the one statement of the line 14-7 (step 3-2).

The CPU 11 judges whether the statement of the line 14-8 to be executed subsequently is in the display state or the non-display state (step 3-3). Since the line 14-8 is in the display state, then the CPU 11 moves the PC-code to the line 14-8 for displaying the source program on the display device 15 (step 3-5). FIG. 15 is illustrative of the source program displayed on the display device 15. As described above, the debugging device in this example is available to perform the same step-in execution as performed by the conventional debugging device.

As described above, in accordance with the debugging device in this embodiment, lower level hierarchy lines of the index line are placed in the non-display state, so that the index line and the lower level hierarchy lines thereof are step-executable by one step, for example, step-in execution, step-over execution and step-out execution. For this reason, plural statements other than the statements in the procedure are executable by one step. The operator needs only to set display/non-display state from the input device 14. There is no need to set a stop position of the program for every time of the one step execution.

The lower level hierarchy lines are lower level hierarchy lines so that the necessary portions of the program to be subjected to the debug and attracted by the operator are selectively displayed on the display device 15. Further, the character position is leveled down for each hierarchy, and the PC-code (or pseudo PC-code) representing the position of the step-execution is displayed for over-viewing the entire of the program on the debug-operation. The debugging device of this embodiment makes it easy to operate the debug processes.

The present invention is not limited to the above examples. Various modifications or applications are acceptable. Available modifications to the above examples of the present invention will subsequently be described.

In the above embodiment, the lower level hierarchy lines of the index line are placed in the non-display state so that the index line and the lower level hierarchy lines thereof are executed by one step. It is, however, possible that the lower level hierarchy lines are lower in display gray scale than the index line for displaying the source program to be debugged on the display device 15.

In the above embodiment, the step-execution is made as one step for each statement or the index line and it's lower level hierarchy lines in the non-display state. It is, however, possible to combine the same with a step-execution based on a cursor position as described in the prior art (4).

In the above embodiment, programs realizing the debugging device on the compute system of FIG. 1 are stored in the storage medium 17 and further read out from the storage medium 17 through a medium driver 16 and then transferred into the program area 12a of the memory 12. It is, however, possible that the programs are distributed from a server on a network through the network with superimposition over a carrier wave.

As described above, in accordance with the present invention, statements other than the statement in the procedure are executable by one step. Operator needs only to set the display state but does not need to set the stop positions of the programs for every times of the one step-execution.

The display/non-display state is set to display only the necessary part of the program to be subjected to the debug and attracted by the operator, for over-viewing the entire of the program in the debugging processes and making the debugging processes easy.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A device for debugging a program comprising:
   a memory unit for storing a program having a hierarchical structure to be debugged;
   a display unit for displaying the program stored in the memory;
   a display state control unit for controlling the display unit to display statements included in the program in selected one of first and second states; and
   a step-execution unit for performing a step-execution of the program to be debugged in accordance with the selected one of the first and second states.

2. The device as claimed in claim 1,
   wherein the first display state is a state that the statements are displayed by the display unit, whilst the second display state is a state that the statements are not displayed by the display unit.

3. The device as claimed in claim 2, wherein the memory stores not only the program but also each of the first and second display states of the statements.

4. The device as claimed in claim 3, wherein the step-execution unit performs the step-execution of the program with reference to individual ones of the first and second display states of the statements stored in the memory.

5. The device as claimed in claim 1, wherein,
   the memory unit further stores each of the statements as set by the display state control unit and
   the step-execution unit performs the step-execution of the program with reference to individual ones of the first and second display states of the statements as stored in the memory unit.

6. The device as claimed in claim 1, wherein the step-execution unit performs the step-execution of statements, by one step, prior to a statement having a hierarchy placed next in the first display state if a lower level hierarchy is placed in the second state.

7. The device as claimed in claim 1, wherein,
   the program includes an index line having a low level hierarchy, a low-leveled hierarchical line under the index line and normal lines, and
   the display unit displays individual statements of the program together with predetermined codes which indicate individual kinds of the statements.

8. The device as claimed in claim 7, wherein the display unit displays individual statements of the programs together with different codes from the codes, which codes indicate the kinds of the statements if the step-execution means performs the step-execution of the index line or the low level hierarchical lines placed in the non-displayed state.

9. The device as claimed in claim 1, wherein the display unit displays the individual statements at displaced positions in level in accordance with individual hierarchies.

10. The device as claimed in claim 1, wherein the display unit displays individual statements of the program together with predetermined codes, which codes indicate that the step-execution is now executing specific statements by the step-execution unit.

11. The device as claimed in claim 1, wherein the step-execution unit performs the step-execution of the program with reference to individual ones of the first and second display states of the statements as stored in the memory unit.

12. The device as claimed in claim 1, wherein the program to be debugged includes at least an index line having a low level hierarchy, at least a low-leveled hierarchical line under the index line, and normal lines.

13. The device as claimed in claim 1, wherein,
   the display unit displays individual statements of the programs together with predetermined codes which indicate individual kinds of the statements; and
   the display unit displays the individual statements at displaced position in level in accordance with individual hierarchies.

14. The device as claimed in claim 1, wherein the display unit displays individual statements of the programs together with predetermined codes which indicate that the step-execution is now on performance by the step-execution unit.

15. A debugging method comprising the steps of:
   displaying a program to be debugged, the program having a hierarchical structure;
   controlling the display step to place individual statements included in the program in a selected one of first and second display states; and
   performing a step-execution of the program to be debugged in accordance with the selected one of the first and second display states.

16. The debugging method as claimed in claim 15, wherein the step-execution step performs the step-execution of the statement by one step prior to a statement having a hierarchy placed next in the first display state, if a lower level hierarchy is placed in the second step.

17. The method as claimed in claim 15, wherein the step-execution step performs the step-execution of the statement including a lower level hierarchy placed in the second step in one step prior to a statement having a hierarchy placed next in the first display state.

18. A storage medium storing a debugging program capable of executing the steps of:
   displaying a program to be debugged, the program having a hierarchical structure;

controlling a display to place individual statements included in the program in a selected one of first and second display states; and performing a step-execution of the program to be debugged in accordance with the selected one of the first and second display states.

19. The storage medium as claimed in claim 18, wherein the step-execution step performs the step-execution of a statement including a lower level hierarchy placed in a second step, in one step, prior to a statement having a hierarchy placed next in the first display state.

20. The storage medium as claimed in claim 18, wherein the step-execution step performs the step-execution of the statement including a lower level hierarchy placed in the second step, in one step, and prior to a statement having a hierarchy placed next in the first display state.

* * * * *